Patented Feb. 27, 1951

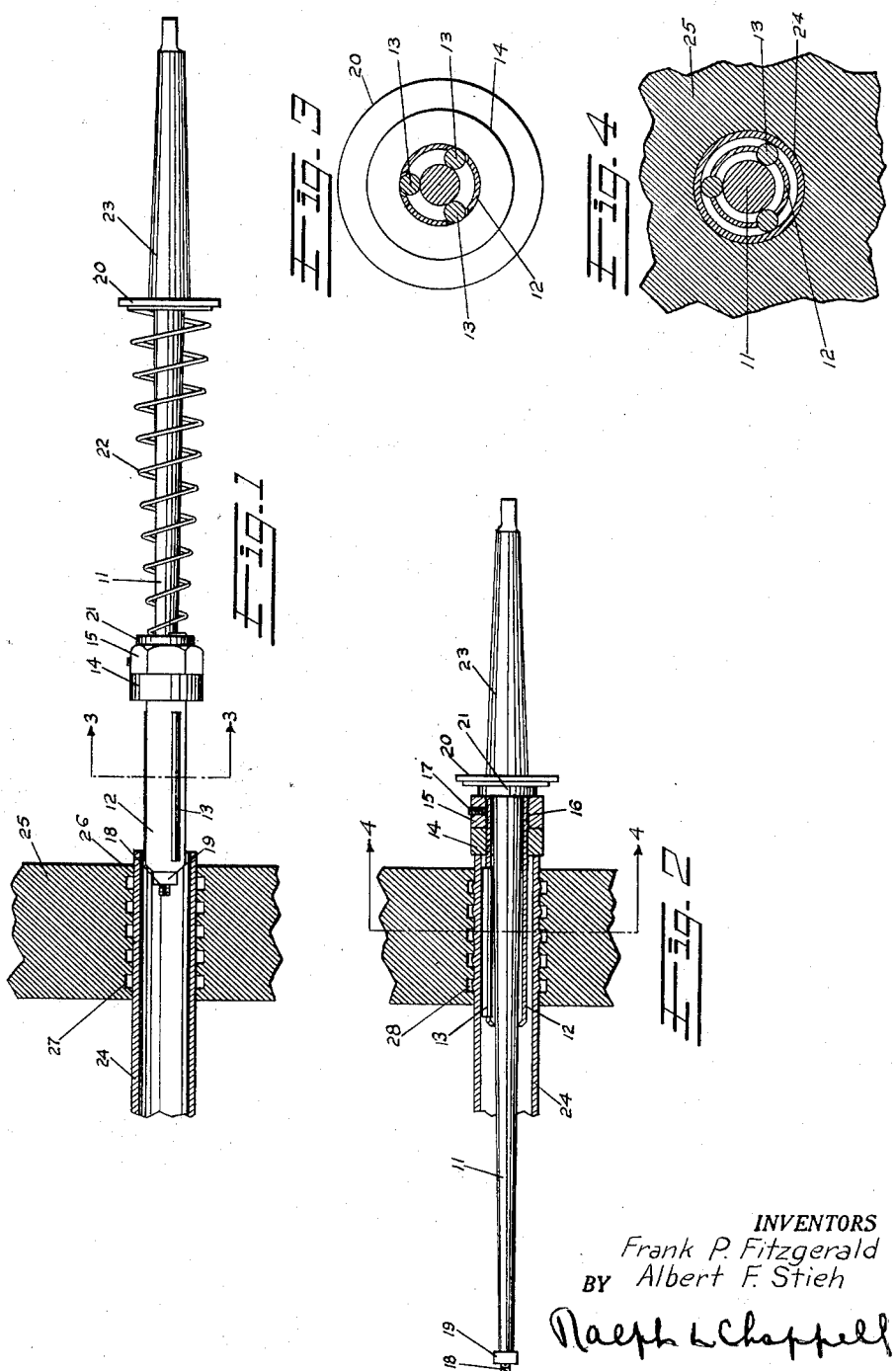

2,543,007

UNITED STATES PATENT OFFICE 2,543,007

TUBE EXPANDER

Frank P. Fitzgerald, New York, N. Y., and
Albert F. Stieh, Bayonne, N. J.

Application August 1, 1945, Serial No. 608,337

3 Claims. (Cl. 153—82)

(Granted under the act of March 3, 1883, as
amended April 30, 1928; 370 O. G. 757)

The present invention concerns a tube expander and particularly concerns a rotary tool to expand the ends of boiler or condenser tubes into watertight and mechanically interlocked relation with their supporting headers.

In the manufacture of boilers, condensers or similar devices wherein a plurality of parallel tubes are mounted at their ends in supporting headers so that fluid of one type can circulate within the tubes while fluid of another type can circulate outside of the tubes, it is necessary that the tubes be mounted in their supporting headers in such manner that a rigid mechanical interlock is effected and also that a watertight seal be provided so that fluid cannot escape through the headers past the ends of the tubes. It is customary in the manufacture of such devices to provide headers with slightly oversize openings into which the extremities of the tubes are loosely inserted, and the extremities of the tubes are then expanded into contact with the oversize openings to effect a tight mechanical interlock and a watertight seal.

The present invention provides for performing the expanding operation a rotary tool that incorporates safety features for preventing injury to the operator and automatic self-adjustment features for preventing damage to the tool or work and for providing maximum speed and efficiency of operation. In its preferred form, the tool comprises a tapered spindle, a cylindrical cage adapted for reciprocation upon the spindle, and a plurality of needle rollers loosely supported in the cage periphery in such manner that upon reciprocation of the cage, the rollers are cammed radially by the action of the tapered spindle. Resilient means are provided for constantly urging the cage toward the small end of the spindle in which position the rollers are in their retracted or radially withdrawn position. The tool is further provided with a shank to permit mounting in a rotary tool holder, for example, in a compressed-air-operated tool holder of conventional design.

In operation, the tool is inserted cage first into the extremity of a tube to be expanded and the tapered shank is forced through the cage to cam the needle rollers radially outward to expand the tube. The resilient means for constantly urging the cage toward the narrow end of the spindle automatically conditions the tool for operation at all times and insures that the needle rollers are in their retracted position during initial insertion into the extremity of the tube.

An object of this invention is to provide an expanding tool that eliminates any need for manual adjustment during operation or for manual adjustment preparatory to starting an expanding operation and provides for completely automatic self-adjustment.

Another object of the invention is to provide an expanding tool that eliminates danger of injury to the operator's hand by eliminating the need for manual adjustment.

Another object of the invention is to provide an expanding tool having a self-adjusting reciprocating cage whereby breakage of the tool due to inadvertent misadjustment is eliminated.

Another object is to provide an expanding tool having a reciprocating cage which is constantly urged by resilient means into proper operating position.

Another object of the invention is to provide an expanding tool that automatically adjusts itself at the initiation of each expanding operation whereby the tool can be used for insertion into and expansion of boiler tubes that are relatively inaccessible and where a single hand alone can be used for operating the tool due to inaccessibility.

Further objects and advantages of this invention, as well as its construction, arrangement and operation, are apparent from the following description and claims in connection with the accompanying drawings, in which, Fig. 1 is an elevational view of a preferred embodiment of the invention at the start of an expanding operation.

Fig. 2 is a sectional view of the tool shown in Fig. 1 as it appears upon the completion of an expanding operation.

Fig. 3 is a transverse sectional view taken substantially along the lines 3—3 of Fig. 1.

Fig. 4 is a transverse sectional view taken substantially along the line 4—4 of Fig. 2.

A preferred form of the invention comprises a tapered spindle 11 upon which is disposed for longitudinal reciprocation a cage 12. Mounted loosely within cage 12 are a series of three circumferentially-spaced needle rollers 13, so disposed that upon longitudinal reciprocation of cage 12, rollers 13 are cammed radially under the influence of tapered spindle 11. Thus, with cage 12 disposed at the narrow end of spindle 11 as shown in Fig. 1, rollers 13 are retracted radially inwardly within cage 12, while if cage 12 is reciprocated to the wide end of spindle 11 as shown in Fig. 2, rollers 13 are cammed radially outward with respect to cage 12. Mounted for rotation upon cage 12 is a slip ring 14 which is secured against movement to the right as seen in Fig. 1 by a nut 15 threaded on cage 12 as shown at 16 and secured in position by a set screw 17. Nut 15 is so adjusted that slip ring 14 can rotate freely.

The narrow extremity of spindle 11 is provided with a threaded portion 18 upon which is mounted a stop nut 19 that serves to limit movement of cage 12 toward the narrow end of spindle 11. The opposite end of spindle 11 is provided with a retainer disc 20 which serves to limit movement of cage 12 in the direction of the wide end of spindle 11. Mounted for free rotation upon spindle 11 adjacent nut 15 is a bushing 21. Disposed between bushing 21 and retainer disc 20 is a conical-spiral compression spring 22 that constantly urges cage 12 toward the narrow end of spindle 11. Cage 12, however, can be reciprocated toward the wide end of spindle 11 into the position shown in Fig. 2 against the action of spring 22 and in such position spring 22 is compressed into a plane as shown in Fig. 2. Extending from retaining disc 20 in alignment with spindle 11 is a tapered shank 23 of conventional design to provide for mounting the tool in a holder of conventional design (not shown) such as a compressed-air-driven rotary tool holder.

In Fig. 1 is disclosed a boiler tube 24 and a header 25 having an oversize opening 26. Opening 26 is provided with a groove 27. Cage 12 is shown at the beginning of its penetration into the extremity of tube 24 and before any expanding action has taken place. In Fig. 2, cage 12 is shown completely penetrated into the end of tube 24 with slip ring 14 contacting the end of tube 24 to retain cage 12 in proper position for the expanding operation. Spindle 11 is reciprocated through cage 12 with rollers 13 cammed radially outward to expand tube 24 and force a portion of the periphery thereof into groove 27 as shown at 28 whereby a tight mechanical interlock and watertight seal between tube 24 and header 25 are provided.

Operation of the device is as follows. With the extremity of boiler tube 24 mounted loosely in oversize header opening 26 and with shank 23 of the expanding tool mounted in a suitable rotary tool holder, the expanding operation is effected in the following manner. As shown in Fig. 1, cage 12 at the start of the operation is positioned against stop nut 19 at the narrow end of spindle 11 under the influence of spring 22 and needle rollers 13 are in radially withdrawn position. Shank 23 and spindle 11 are then aligned with the opening in tube 24 and cage 12 is inserted into the end of tube 24 until slip ring 14 abuts the end of tube 24. During this operation, spindle 11 and cage 12 are rotating under the influence of the tool holder (not shown). Spindle 11 is now urged toward the left as shown in the drawings against the action of spring 22 which operation causes rollers 13 to be cammed outwardly under the influence of tapered spindle 11. Rollers 13 are forced into contact with the inner surface of tube 24 and, as they are cammed further outwardly, they force tube 24 to expand and force a portion of the exterior of tube 24 into groove 27 formed in header 25 as shown at 28. The operation can be stopped at any desired point when in the operator's judgment rollers 13 have caused sufficient expansion of tube 24. In any event, the operation is brought to a conclusion automatically when spring 22 becomes completely compressed so that spindle 11 cannot be reciprocated further. Thus rollers 13 have an automatically-defined maximum radius of expansion to prevent injury to the tool or to tube 24.

Spring 22 constantly urges cage 12 toward the narrow end of spindle 11 and thus provides automatic self-adjustment of the tool and eliminates any need for manual adjustment. For example, at the start of an expanding operation, spring 22 automatically forces cage 12 against stop 19 at the narrow end of spindle 11. Under such conditions, rollers 13 are in their position of maximum radial retraction whereby the tool is conditioned for insertion into a tube and for initiation of an expanding operation. Thus it is impossible that the cage be inadvertently positioned at the wide part of the spindle with the rollers in radially expanded position, whereby damage might result at the start of the expanding operation and it is further not necessary that the operator manually position the cage. Thus the tool and work are protected from damage through possible misadjustment of the tool, and the operator is protected from injury to his hand since manual adjustment of the tool is not necessary.

Modifications and changes can be made in the above embodiment of this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A tool comprising a tapered spindle, a cage with rollers adapted for radial movement upon sliding of the cage along the spindle, means at the narrow end of the spindle for limiting movement of the cage, a relatively thin, disc-shaped retainer of relatively large diameter, a conical-spiral compression spring having the end of larger diameter seated on one face of said retainer, and a relatively thin bushing of smaller diameter than said retainer and seated against the end of smaller diameter of said spring, said retainer and said bushing being arranged in alignment with the axis of said conical-spiral spring, said retainer, bushing and spring being adapted to be disposed about and in coaxial relation with the tapered portion of the spindle, said spring being arranged for compression along its axis into a flat spiral so that said retainer and bushing are brought into relatively close proximity and said retainer, spring and bushing form a compact unit having a relatively small dimension along said axis.

2. A portable and hand-operated expanding tool comprising a tapered spindle, a cage mounted on said spindle so that relative longitudinal movement between said cage and spindle can be effected, rollers mounted in said cage for radial movement, said rollers being positively moved in a radially outward direction by the camming action of said tapered spindle upon relative movement of said cage toward the enlarged portion of said spindle and said rollers being free to move in a radially inward direction upon relative movement of the cage toward the narrow portion of said spindle, a stop at the narrow end of said spindle to limit relative movement of said cage toward said narrow portion, a relatively thin, disc-shaped retainer of relatively large diameter disposed upon the enlarged portion of said tapered spindle, a conical-spiral compression spring having the end of larger diameter seated on a face of said retainer, said spring being disposed about said spindle and extending toward the narrow portion of said spindle, and a relatively thin bushing seated at the other extremity of said spring for sliding movement on said spindle and adapted to bear against said cage, said bushing being of smaller diameter than said retainer, said retainer serving to limit relative movement of said cage and bushing toward the enlarged portion of said spindle, said spring serving to urge said cage and bushing into relative position toward the narrow end of the spindle whereby said rollers can move inwardly, said spring being arranged for compression along its axis into a flat spiral so that said retainer and bushing are brought into relatively close proximity and said retainer, spring and bushing form a compact unit having a relatively small dimension along said axis.

3. In a portable and hand-operated tube expander a tapered spindle, a cage with rollers adapted for radial movement upon sliding of the cage along the spindle, and means at the narrow end of the spindle for limiting movement of the cage toward the narrow end, a relatively thin disc-shaped retainer of relatively large diameter, said retainer being adapted to be disposed upon the enlarged end of the spindle, a conical-spiral compression spring having the end of larger diameter seated on one face of said retainer and extending toward the narrow end of said spindle, said spring being disposed about said spindle, and a relatively thin bushing of smaller diameter than said retainer, said bushing being seated against the end of smaller diameter of said spring for sliding movement on said spindle, said spring being arranged for compression along its axis into a flat spiral so that said retainer and bushing are brought into relatively close proximity and said retainer, spring and bushing form a compact unit having a relatively small dimension along said axis.

FRANK P. FITZGERALD.
ALBERT F. STIEH.

REFERENCES CITED

The following references are of record in the file of this patent:

UNITED STATES PATENTS

| Number | Name | Date |
|---|---|---|
| 648,765 | Lykken et al. | May 1, 1900 |
| 1,015,447 | Lillibridge | Jan. 23, 1912 |
| 1,077,837 | Kerrigan | Nov. 4, 1913 |
| 1,138,311 | Pollard | May 4, 1915 |
| 1,265,283 | Wiedeke | May 7, 1918 |
| 1,322,921 | Maupin | Nov. 25, 1919 |
| 1,357,059 | Ihsen | Oct. 26, 1920 |
| 1,417,979 | Dixon | May 30, 1922 |
| 1,819,915 | Morrison | Aug. 18, 1931 |
| 1,921,810 | Duchesne | Aug. 8, 1933 |
| 1,942,612 | Naher | Jan. 9, 1934 |